United States Patent
Gleason et al.

(10) Patent No.: US 9,615,025 B2
(45) Date of Patent: Apr. 4, 2017

(54) WIRE SUSPENSION MOUNTING APPROACH FOR REDUCED OPTICAL IMAGE STABILIZATION PACKAGE SIZE

(71) Applicant: Apple Inc., Cupertino, CA (US)

(72) Inventors: Jeffrey N. Gleason, San Francisco, CA (US); Ryan J. Dunn, San Francisco, CA (US); Scott W. Miller, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 266 days.

(21) Appl. No.: 14/478,930

(22) Filed: Sep. 5, 2014

(65) Prior Publication Data

US 2016/0073028 A1    Mar. 10, 2016

(51) Int. Cl.
| | |
|---|---|
| *H04N 5/232* | (2006.01) |
| *G02B 7/08* | (2006.01) |
| *H04N 5/225* | (2006.01) |
| *G02B 27/64* | (2006.01) |

(52) U.S. Cl.
CPC ........... *H04N 5/23287* (2013.01); *G02B 7/08* (2013.01); *G02B 27/646* (2013.01); *H04N 5/2254* (2013.01)

(58) Field of Classification Search
CPC ............. H04N 5/2328; H04N 5/23287; G03B 2205/0007; G03B 2205/0023; G03B 2205/0038; G03B 2205/0015; G02B 27/64; G02B 27/644; G02B 27/646
See application file for complete search history.

(56) References Cited

U.S. PATENT DOCUMENTS

| | | | |
|---|---|---|---|
| 8,611,735 B2 | 12/2013 | Sekimoto | |
| 2002/0176713 A1* | 11/2002 | Kai | G03B 17/48 396/429 |
| 2013/0016428 A1 | 1/2013 | Sugawara et al. | |
| 2014/0055630 A1* | 2/2014 | Gregory | G03B 3/02 348/208.2 |
| 2014/0327965 A1 | 11/2014 | Chen et al. | |
| 2015/0022891 A1* | 1/2015 | Hu | G02B 7/08 359/557 |

* cited by examiner

*Primary Examiner* — Nelson D. Hernández Hernández
(74) *Attorney, Agent, or Firm* — Robert C. Kowert; Meyertons, Hood, Kivlin, Kowert & Goetzel, P.C.

(57) ABSTRACT

Some embodiments include an optics assembly. In some embodiments, the optics assembly includes an optics component. In some embodiments, the optics assembly is configured to move within the apparatus on one or more axes orthogonal to an optical axis of the optics component. In some embodiments, the optics assembly is suspended by a plurality of wires on a base component of the apparatus, each wire of the plurality of wires being substantially parallel to the optical axis of the optics component. Some embodiments include a base assembly component or substrate having an upper surface plane and a lower surface plane. In some embodiments, one or more terminations are disposed around the plurality of wires. In some embodiments, the terminations are located beyond the upper surface plane of the base assembly component.

20 Claims, 9 Drawing Sheets

WIRE SUSPENSION MOUNTING APPROACH FOR REDUCED OPTICAL IMAGE STABILIZATION PACKAGE SIZE

BACKGROUND

Technical Field

This disclosure relates generally to control of the motion of camera components.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation or disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane or field in front of the camera at an image plane to be captured by an image sensor (also referred to herein as a photosensor).

In some such autofocus mechanisms, the optical lens is moved as a single rigid body along the optical axis (referred to as the Z axis) of the camera to refocus the camera. In addition, high image quality is easier to achieve in small form factor cameras if lens motion along the optical axis is accompanied by minimal parasitic motion in the other degrees of freedom, for example on the X and Y axes orthogonal to the optical (Z) axis of the camera. Thus, some small form factor cameras that include autofocus mechanisms may also incorporate optical image stabilization (OIS) mechanisms that may sense and react to external excitation or disturbance by adjusting location of the optical lens on the X and/or Y axis in an attempt to compensate for unwanted motion of the lens.

SUMMARY OF EMBODIMENTS

An apparatus for controlling motions of an optics component (e.g., a lens or lens system) relative to an image sensor within a camera may include an actuator mechanism for controlling the position of the optics component relative to the image sensor of a camera. The apparatus may be referred to herein as an actuator module.

Some embodiments include an optics assembly. In some embodiments, the optics assembly includes an optics component. In some embodiments, the optics assembly is configured to move within the apparatus on one or more axes orthogonal to an optical axis of the optics component. In some embodiments, the optics assembly is suspended by a plurality of wires on a base component of the apparatus, each wire of the plurality of wires being substantially parallel to the optical axis of the optics component. Some embodiments include a base assembly component or substrate having an upper surface plane and a lower surface plane. In some embodiments, one or more terminations are disposed around the plurality of wires. In some embodiments, the terminations are configured to terminate respective ones of the plurality of wires and are located beyond the upper surface plane of the base assembly component, when measured from the optics assembly.

Figure 1:
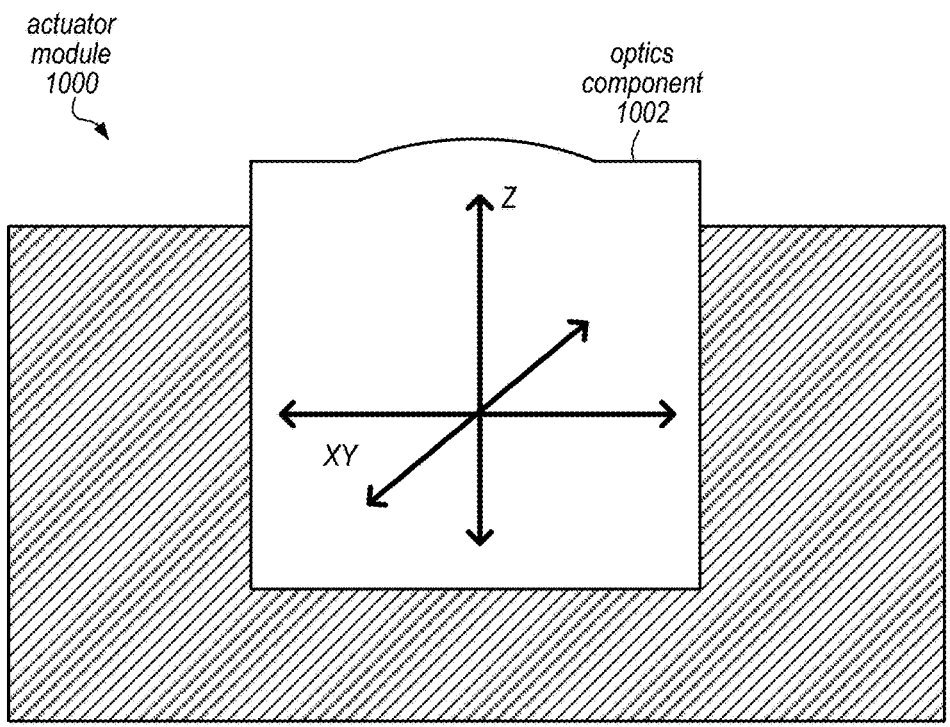
FIG. 1 illustrates motion of an optics component within an actuator module, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

An apparatus for controlling motions of an optics component relative to an image sensor within a camera may include an actuator mechanism for controlling the position of the optics component relative to the image sensor of the camera. The apparatus may be referred to herein as an actuator module. In some embodiments, an optics assembly that includes the optics component and that may also include at least some components of the actuator mechanism (e.g., magnets and/or coils) may be suspended on a plurality of wires or beams over a base of the actuator module, with the image sensor disposed at or below the base.

Each suspension wire may be substantially parallel to the optical axis. In at least some embodiments, the wires are capable of bending deformations that allow the optics assembly to move in linear directions orthogonal to the optical axis (i.e., on the XY plane). The actuator mechanism may provide optical image stabilization (OIS) for the camera, and in some embodiments may be implemented as a voice coil motor (VCM) actuator mechanism. The actuator module may, for example, be used as or in a miniature or small form factor camera suitable for small, mobile multipurpose devices such as cell phones, smartphones, and pad or tablet devices. In at least some embodiments, the actuator module may also include a focusing mechanism for moving the optics component along an optical (Z) axis within the optics assembly.

Some embodiments include an optics assembly. In some embodiments, the optics assembly includes an optics component. In some embodiments, the optics assembly is configured to move within the apparatus on one or more axes orthogonal to an optical axis of the optics component. In some embodiments, the optics assembly is suspended by a plurality of wires on a base component of the apparatus, each wire of the plurality of wires being substantially parallel to the optical axis of the optics component. Some embodiments include a base assembly component or substrate having an upper surface plane and a lower surface plane. In some embodiments, one or more terminations are disposed around the plurality of wires. In some embodiments, the terminations are configured to terminate respective ones of the plurality of wires and are located beyond the upper surface plane of the base assembly component, when measured from the optics assembly.

In some embodiments, the base assembly component includes a pocket, step, cavity, or indentation below the upper surface plane at each location that is configured to receive one of the terminations. In some embodiments, the terminations are located beyond lateral edges of the base assembly component relative to an axis perpendicular to the optical axis of the optics component. In some embodiments, the base assembly component is a substrate supporting an image sensor for capturing an image data structure representing light received through the optics component.

In some embodiments, the termination includes solder applied to a wire of the plurality of wires. In some embodiments, the termination includes a resin applied to a wire of the plurality of wires. In some embodiments, the optics assembly includes a coil holder having a pocket, step, cavity, or indentation at each wire location that is configured to contain the wire. Some embodiments further include a cover coupled to the base component. In some embodiments, the base assembly component includes a through-pipe from the upper surface plane to the lower surface plane at each location that is configured to receive one of the terminations.

In some embodiments, a method for manufacturing a camera module includes assembling a base assembly for an optical image stabilization (OIS) voice coil motor (VCM) actuator module. In some embodiments, an optics assembly is assembled for the OIS VCM actuator module. In some embodiments, the optics assembly is configured to move within the actuator module on one or more axes orthogonal to an optical axis of an optics component. In some embodiments, the optics assembly is suspended by a plurality of wires connecting to the base assembly of the actuator module, each wire being substantially parallel to the optical axis of the optics component. In some embodiments, the plurality of wires is terminated with one or more terminations disposed around the plurality of wires. In some embodiments, the terminations are located beyond the upper surface plane of the base assembly component, when measured from the optics assembly when measured along an optical axis of the optics assembly.

In some embodiments, the terminating the plurality of wires with one or more terminations disposed around the plurality of wires further includes applying solder to one or more of the plurality of wires at locations beyond the upper surface plane of the base assembly component, when measured from the optics assembly when measured along an optical axis of the optics assembly. In some embodiments, the terminating the plurality of wires with one or more terminations disposed around the plurality of wires further includes applying resin to one or more of the plurality of wires at locations beyond the upper surface plane of the base assembly component, when measured from the optics assembly when measured along an optical axis of the optics assembly.

Some embodiments include a camera. In some embodiments, the camera includes a photosensor, an optics assembly, and an actuator module, among other components. In some embodiments, a photosensor is attached to a substrate and configured to capture light projected onto a surface of the photosensor. In some embodiments, an optics assembly is configured to refract light from an object field located in front of the camera onto the photosensor. In some embodiments, the actuator module includes an optical image stabilization (OIS) mechanism configured to move the optics assembly within the actuator module on one or more axes orthogonal to an optical axis of the camera to stabilize an image plane formed by the optics assembly at the photosensor.

In some embodiments, the optics assembly is suspended by a plurality of wires on a base component of the mechanism, each wire being substantially parallel to the optical axis of the optics component. In some embodiments, the camera includes one or more terminations disposed around the plurality of wires. In some embodiments, the terminations are configured to terminate respective ones of the plurality of wires. In some embodiments, the terminations are located beyond the upper surface plane of the substrate, when measured from the optics assembly. In some embodiments, the OIS mechanism is a voice coil motor (VCM) technology actuator.

In some embodiments, each termination includes a solder termination of the wire. In some embodiments, the terminations are located beyond lateral edges of the base assembly component relative to an axis perpendicular to the optical axis of the optics component. In some embodiments, each termination includes a mechanical crimping of the wire.

Camera Component Motion

Figure 2:
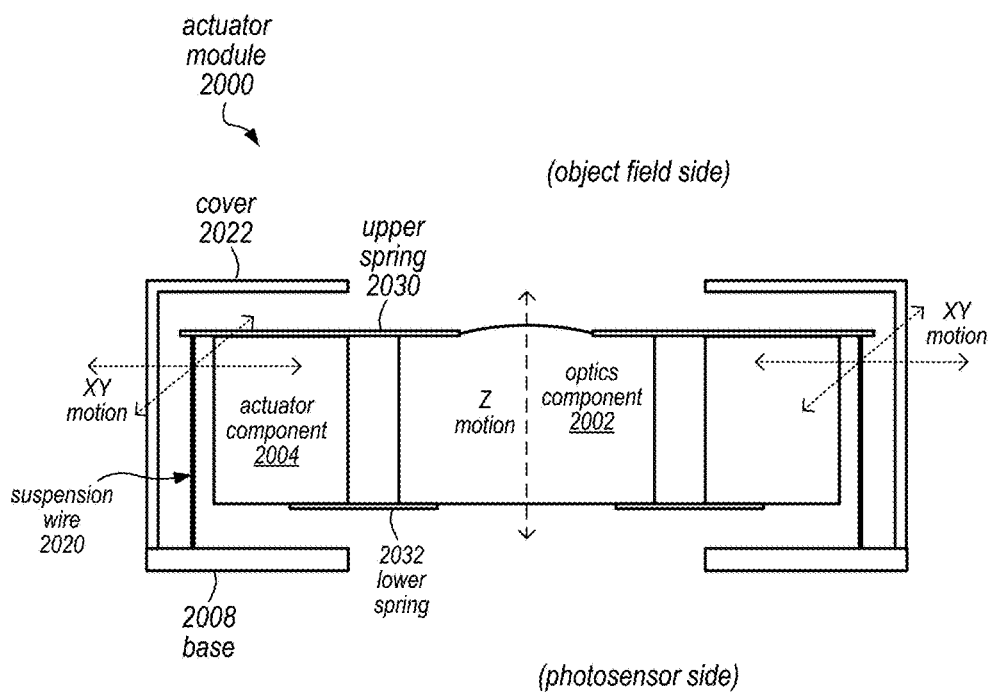
FIG. 2 depicts motion of an optics component within an actuator module, according to at least some embodiments.

FIGS. 1 and 2 illustrate motion of an optics component 1002 within an actuator module 1000, according to at least some embodiments. As shown in FIG. 1A, an actuator module 1000 may provide optical image stabilization (OIS) for the optics component 1002. In at least some embodiments, the actuator module 1000 may implement a voice coil motor (VCM) actuator mechanism.

An actuator module 1000 such as an OIS VCM actuator module may provide motion to optics component 1002 in the XY plane. In addition, in some embodiments, motion may also be provided to optics component 1002 on the Z (optical) axis, for example by a focusing mechanism of the actuator module 1000 for moving the optics component 1002 along the optical (Z) axis within the actuator module 1000. The XY plane motion is, for example, for optical image stabilization (OIS) relative to a photosensor in a camera. The Z axis motion may, for example, be for optical focusing or autofocus purposes in cameras that incorporate focusing/autofocus mechanisms. Example embodiments of an optical image stabilization (OIS) voice coil motor (VCM) actuator are illustrated as actuator module 3000 in FIGS. 4-6. Embodiments of the actuator module 1000 may, for example, be used in a miniature or small form factor camera suitable for small, mobile multipurpose devices such as cell phones, smartphones, and pad or tablet devices, as described below with respect to FIGS. 11-12.

FIG. 2 illustrates components of an example actuator module 2000 that provides X, Y and Z motions for an optics component 2002, according to at least some embodiments. In some embodiments, an optics assembly of the actuator module 2000 may include an optics component 2002 that is coupled to an actuator component 2004 by upper and/or lower springs 2030 and 2032. Note that the object field side of the optics component 2002 may be referred to as the top or upper side or surface of the actuator module 2000 and optics assembly, while the photosensor side of the optics component 2002 may be referred to as the bottom or lower side or surface of the actuator module 2000 and optics assembly. The actuator component 2004 may, for example, include magnets used in a voice coil motor (VCM) actuator mechanism. The springs 2030 and 2032 may be flexible to allow motion of the optics component 2002 on the Z axis relative to the actuator component 2004.

The actuator mechanism may be configured to move the optics component 2002 on the Z axis within the actuator module 2000 to provide focusing or autofocus for the camera. The optics assembly, which includes at least optics component 2002, actuator component 2004, and springs 2030 and 2032, may be suspended within the actuator module 2000 on two or more suspension wires 2020. For example, the suspension wires 2020 may be mounted to base 2008, and the optics assembly may be suspended on the wires 2020 at the outer portion of the upper springs 2030. The suspension wires 2020 may be flexible to allow motion of the optics assembly, and thus of the optics component 2002, on the XY axes orthogonal to the Z (optical) axis of the optics component 2002. The actuator component 2002 may be configured to move the optics assembly and thus the optics component 2002 on the XY axes within the actuator module 2000 to provide optical image stabilization (OIS) for the camera.

Figure 3:
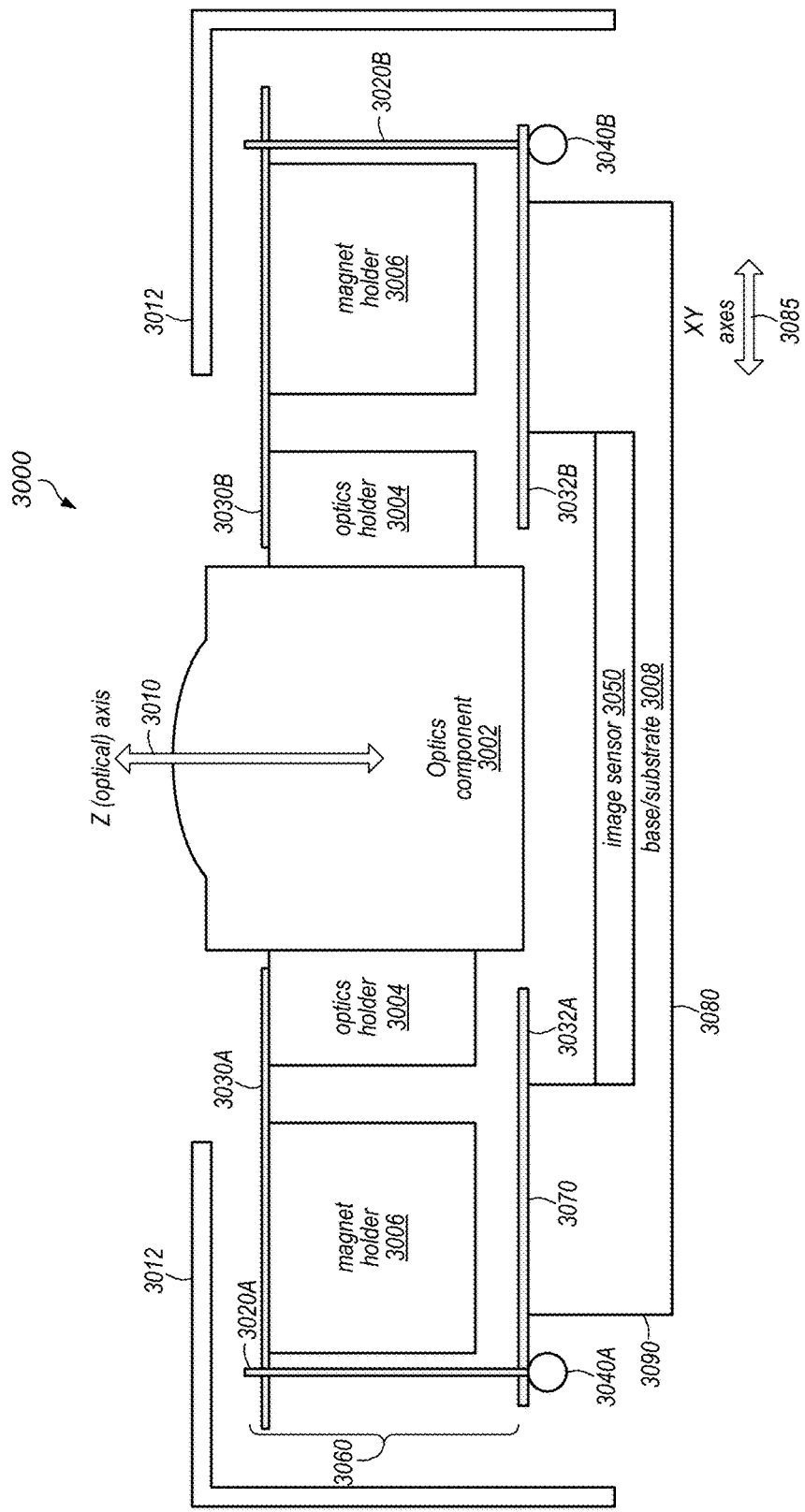
FIG. 3 illustrates a side view of an example actuator module that shows termination of a plurality of wires below an upper surface of a base according to at least some embodiments.
Figure 4:
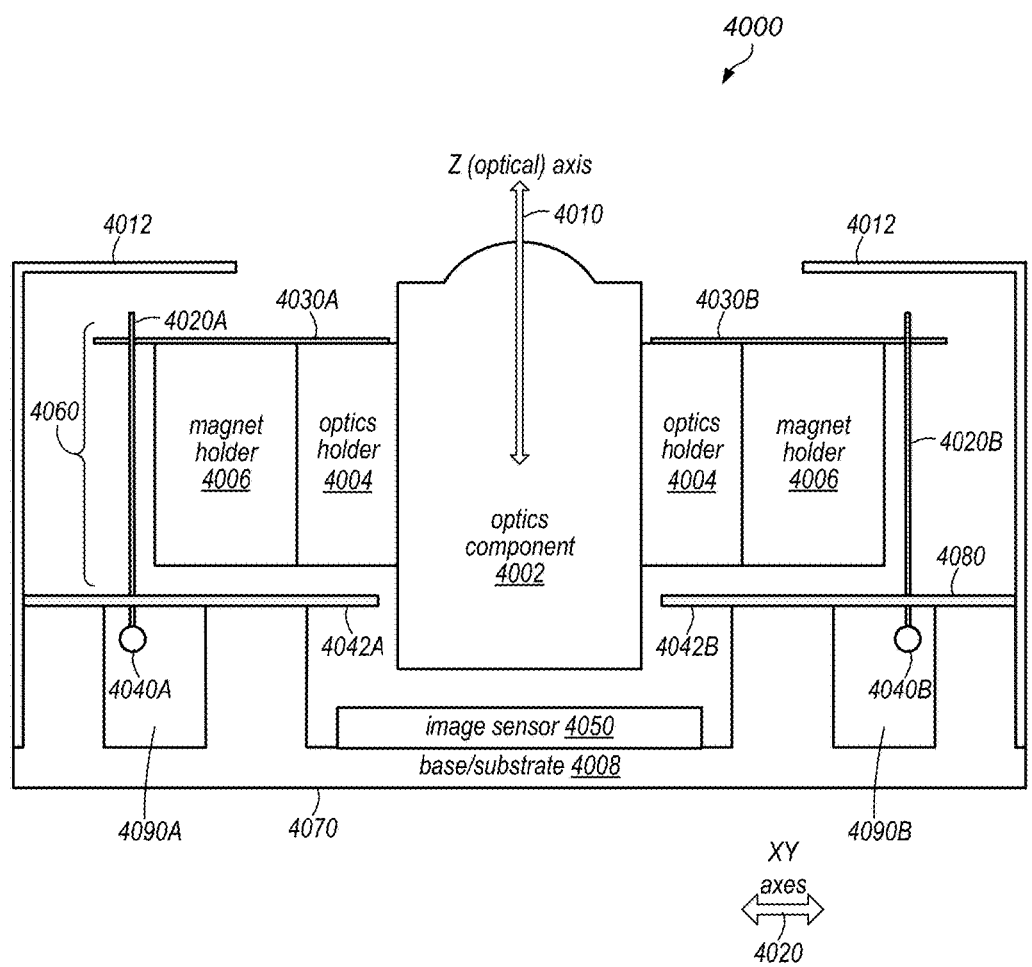
FIG. 4 depicts a side view of an alternative example actuator module that includes termination of a plurality of wires below an upper surface of a base according to at least some embodiments.

FIGS. 3-6 illustrate embodiments of an example actuator module in which embodiments of suspension wire termination techniques as described herein may be applied. FIG. 3 illustrates a side view of an example actuator module that shows termination of a plurality of wires below an upper surface of a base according to at least some embodiments. In particular, embodiments of the wire termination techniques may be applied within an actuator module 3000 as illustrated in FIGS. 3-6 to stabilize and increase control performance during optical image stabilization (OIS) of an optics component 3002 suspended on wires 3020 with terminations 3040 within an actuator module 3000 as shown in FIG. 4.

Figure 5:
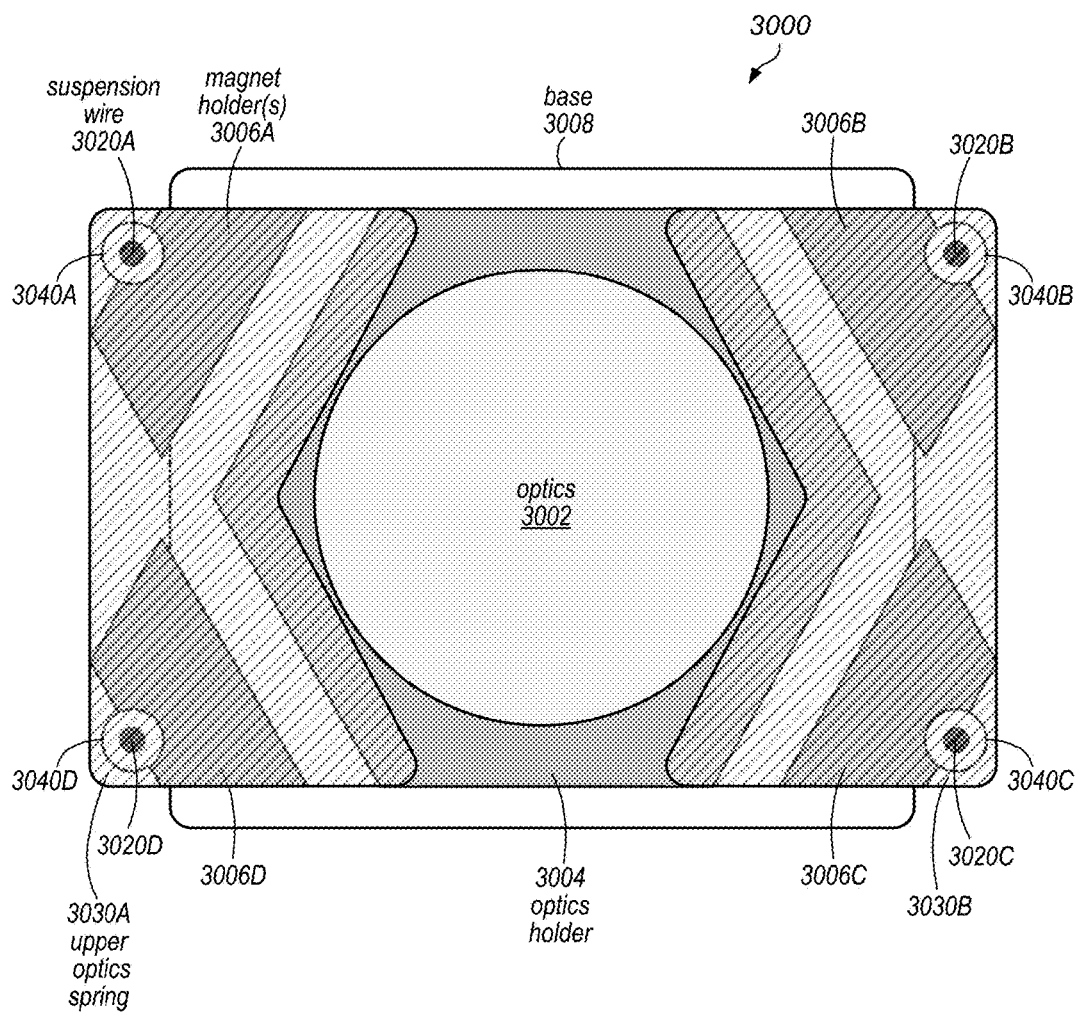
FIG. 5 illustrates a top view of an example actuator module that shows termination of a plurality of wires below an upper surface of a base according to at least some embodiments.
Figure 6:
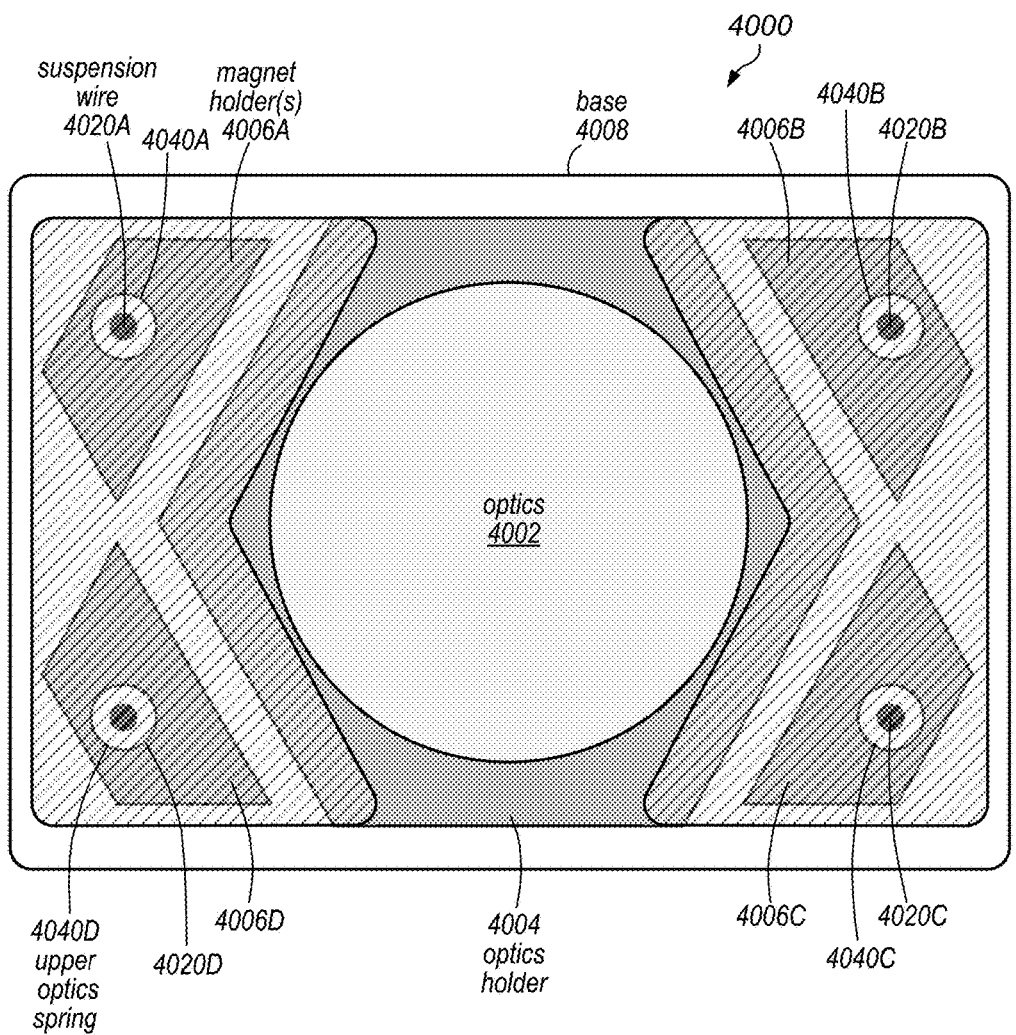
FIG. 6 depicts a top view of an alternative example actuator module that shows termination of a plurality of wires below an upper surface of a base according to at least some embodiments.

FIG. 4 shows a side view of an alternative example embodiment of an actuator module 3000 that may, for example, be used in small form factor cameras, according to at least some embodiments, and in which embodiments of a wire termination technique may be applied. FIGS. 5-6 show top views of actuator modules similar to actuator module 3000 of FIG. 3 and actuator module 4000 of FIG. 4 with the cover removed.

An actuator module 3000 including an optics actuator assembly 3060 may be part of a camera module 3000 and may include a base or substrate 3008, an optics component 3002, and a cover 3012. Cover 3012 may be attached to the base or substrate 3008, substantially enclosing the actuator assembly 3060 while leaving an aperture to allow light from an object field in front of the camera module 3000 to reach the optics component 3002 and leaving an opening in base 3008 to allow light refracted from optics component 3002 to reach the image sensor 3050.

Base 3008 may include one or more of, but is not limited to a ceramic substrate, to which is attached one or more magnet displacement sensors (not shown), and suspension wires 3020 around which are terminations 3040. In at least some embodiments, there are four suspension wires 3020. An optics assembly or optics component 3002 may be suspended on the base 3008 by suspension of the upper springs 3030 of optics assembly 3002 on the suspension wires 3020. Camera module 3000 may include one or more of, but is not limited to, optics component 3002, optics holder 3004, magnet holder(s) 3006, upper spring(s) 3030, and lower spring(s) 3032. The upper and lower spring(s) may be collectively referred to herein as optics springs. In actuator module 3000, an optics component 3002 (e.g., a lens or lens assembly) may be screwed, mounted or otherwise held in or by an optics holder 3004. In at least some embodiments, the optics component 3002/optics holder 3004 assembly may be suspended from or attached to the magnet holder 3006 by upper spring(s) 3030, and lower spring(s) 3032. Note that upper spring(s) 3030 and lower spring(s) 3032 are flexible to allow the actuator assembly 3060 a range of motion along the Z (optical) axis for optical focusing, and wires 3020 are flexible to allow a range of motion on the XY plane orthogonal to the optical axis for optical image stabilization.

One of skill in the art will readily comprehend in light of having read the present disclosure that, in some embodiments, an actuator module 3000 of a camera module may not include magnets and magnet holder(s) 3006, but may include a yoke or other structure that may be used to help support the optics assembly 3060 on suspension wires 3020 via upper sprigs 3030. Such embodiments do not depart from the scope of the present disclosure. However in some embodiments, actuator module 3000 may not include some elements and may include some others not described herein for the sake of simplicity in illustration. In general, other embodiments of an actuator module 3000 may include fewer or more components than the example actuator module 3000 shown in FIGS. 3-6. Also note that, while embodiments show the actuator module 3000 suspended on wires 3020, other mechanisms may also be used to suspend an actuator module assembly 3000 in other embodiments without departing from the scope of the present disclosure.

In some embodiments, an optics assembly 3060 including an optics component 3002 is configured to move within an apparatus, such as a camera module or actuator module 3000, on one or more axes orthogonal to an optical axis of the optics component 3002 (z-axis 3010). The optics assembly 3060 is suspended by a plurality of wires 3020 on a base component 3008 of the apparatus 3000, each wire 3020 being substantially parallel to the optical axis of the optics component 3002. One or more terminations 3040 is disposed around the plurality of wires 3020.

In some embodiments, an optics assembly 3000 includes an optics component 3002. In some embodiments, the optics assembly 3000 is configured to move within an apparatus on one or more axes (e.g. x-y axis 3085) orthogonal to an optical axis 3010 of the optics component 3002. The optics assembly is suspended by a plurality of wires 3020 on a base component 3008 of the apparatus, each wire 3020 of the plurality of wires being substantially parallel to the optical axis 3010 of the optics component 3002. Some embodiments further include a base assembly component 3008 having an upper surface plane 3070 and a lower surface plane 3080. One or more terminations 3040 are disposed around the plurality of wires 3020. The terminations 3040 are configured to terminate respective ones of the plurality of wires 3020, and the terminations 3040 are located beyond the upper surface plane 3070 (also called a near surface plane) of the base assembly component 3008, when measured from the optics assembly 3002.

In some embodiments, the terminations 3040 are located beyond lateral edges 3090 of the base assembly 3008 component along an axis perpendicular to the optical axis of the optics component. In some embodiments, the base assembly component 3008 is a substrate supporting an image sensor 3050 for capturing an image data structure representing light received through the optics component 3002.

In some embodiments, the termination 3040 includes solder applied to a wire of the plurality of wires. In some embodiments, the termination 3040 includes a resin applied to a wire of the plurality of wires. In some embodiments, the optics assembly 3060 includes a magnet holder 3004 having a pocket, step, cavity, or indentation at each wire location that is configured to contain the wire 3020. Some embodiments further include a cover 3012 coupled to the base component 3008.

FIG. 4 depicts a side view of an example actuator module that shows termination of a plurality of wires below an upper surface of a base according to at least some embodiments. An actuator module 4000 including an optics actuator assembly 4060 may be part of a camera module 4000 and may include a base or substrate 4008, an optics component 4002, and a cover 4012. Cover 4012 may be attached to the base or substrate 4008, substantially enclosing the actuator assembly 4060 while leaving an aperture to allow light from an object field in front of the camera module 4000 to reach the optics component 4002 and leaving an opening in base 4008 to allow light refracted from optics component 4002 to reach the image sensor 4050.

Base 4008 may include one or more of, but is not limited to a ceramic substrate, to which is attached one or more magnet displacement sensors (not shown), and suspension wires 4020 around which are terminations 4040. In at least some embodiments, there are four suspension wires 4020. An optics assembly or optics component 4002 may be suspended on the base 4008 by suspension of the upper springs 4030 of optics assembly 4002 on the suspension wires 4020. Camera module 4000 may include one or more of, but is not limited to, optics component 4002, optics holder 4004, magnet holder(s) 4006, upper spring(s) 4030, and lower spring(s) 4042. The upper and lower spring(s) may be collectively referred to herein as optics springs. In actuator module 4000, an optics component 4002 (e.g., a lens or lens assembly) may be screwed, mounted or otherwise held in or by an optics holder 4004. In at least some embodiments, the optics component 4002/optics holder 4004 assembly may be suspended from or attached to the magnet holder 4006 by upper spring(s) 4030, and lower spring(s) 4042. Note that upper spring(s) 4030 and lower spring(s) 4042 are flexible to allow the actuator assembly 4060 a range of motion along the Z (optical) axis for optical focusing, and wires 4020 are flexible to allow a range of motion on the XY plane orthogonal to the optical axis for optical image stabilization.

One of skill in the art will readily comprehend in light of having read the present disclosure that, in some embodiments, an actuator module 4000 of a camera module may not include magnets and magnet holder(s) 4006, but may include a yoke or other structure that may be used to help support the optics assembly 4060 on suspension wires 4020 via upper sprigs 4030. Such embodiments do not depart from the scope of the present disclosure. However in some embodiments, actuator module 4000 may not include some elements and may include some others not described herein for the sake of simplicity in illustration. In general, other embodiments of an actuator module 4000 may include fewer or more components than the example actuator module 4000 shown in FIGS. 4-6. Also note that, while embodiments show the actuator module 4000 suspended on wires 4020, other mechanisms may also be used to suspend an actuator module assembly 4000 in other embodiments without departing from the scope of the present disclosure.

In some embodiments, an optics assembly 4060 including an optics component 4002 is configured to move within an apparatus, such as a camera module or actuator module 4000, on one or more axes orthogonal to an optical axis of the optics component 4002 (z-axis 4010). The optics assembly 4060 is suspended by a plurality of wires 4020 on a base component 4008 of the apparatus 4000, each wire 4020 being substantially parallel to the optical axis of the optics component 4002. One or more terminations 4040 is disposed around the plurality of wires 4020.

In some embodiments, an optics assembly 4000 includes an optics component 4002. In some embodiments, the optics assembly 4000 is configured to move within an apparatus on one or more axes (e.g. x-y axis 4085) orthogonal to an optical axis 4010 of the optics component 4002. The optics assembly is suspended by a plurality of wires 4020 on a base component 4008 of the apparatus, each wire 4020 of the plurality of wires being substantially parallel to the optical axis 4010 of the optics component 4002. Some embodiments further include a base assembly component 4008 having an upper surface plane 4070 and a lower surface plane 4080. One or more terminations 4040 are disposed around the plurality of wires 4020. The terminations 4040 are configured to terminate respective ones of the plurality of wires 4020, and the terminations 4040 are located beyond the upper surface plane 4070 (also called a near surface plane) of the base assembly component 4008, when measured from the optics assembly 4002.

In some embodiments, the base assembly component 4008 is a substrate supporting an image sensor 4050 for capturing an image data structure representing light received through the optics component 4002.

In some embodiments, the termination 4040 includes solder applied to a wire of the plurality of wires. In some embodiments, the termination 4040 includes a resin applied to a wire of the plurality of wires. In some embodiments, the optics assembly 4060 includes a magnet holder 4004 having a pocket, step, cavity, or indentation at each wire location that is configured to contain the wire 4020. Some embodiments further include a cover 4012 coupled to the base component 4008. In some embodiments the base assembly component includes a pocket, step, cavity 4090, or indentation below the upper surface plane at each location that is configured to receive one of the terminations. In some embodiments, the base assembly component includes a through-pipe from the upper surface plane to the lower surface plane at each location that is configured to receive one of the terminations.

FIG. 5 shows a top view of an example actuator module 3000, according to at least some embodiments, and is not intended to be limiting. In FIG. 5, base 3008 and suspension wires 3020 with terminations 3040 are shown in FIG. 5, while optics 3002, optics holder 3004, magnet holders 3006, lower optics spring 3032, and upper optics spring 3030 are also shown. The cover 3012 is not shown in FIG. 5. FIG. 5 shows example locations for four suspension wires 3020 and corresponding terminations 3040 at through-holes drilled near the corners magnet holders 3006 of the actuator module 3000, an example location/configuration of upper optics springs 3030 that suspend optics assembly 3060 on suspension wires 3020 and to which magnet holder(s) and optics holder 3004 are attached and thus suspended, and an example location/configuration of lower optics spring 3032 attached to the bottoms or lower surfaces of magnet holder (s) and optics holder 3004. Note that more or fewer suspension wires 3020 may be used in some embodiments.

In the example configuration shown in FIG. 5, four separate magnet holders 3006 are shown disposed around optics holder 3004, each attached to optics springs 3030 and 3032, and each typically holding one of four magnets used in the example actuator module 3000. In some embodiments, the terminations 3040 are located beyond lateral edges 3090 of the base assembly 3008 component along an axis perpendicular to the optical axis of the optics component 3002. In some embodiments, the base assembly component 3008 is a substrate supporting an image sensor for capturing an image data structure representing light received through the optics component 3002.

FIG. 6 depicts a top view of an alternative example actuator module that shows termination of a plurality of wires below an upper surface of a base according to at least some embodiments. In FIG. 6, base 4008 and suspension wires 4020 with terminations 4040 are shown in FIG. 6, while optics 4002, optics holder 4004, magnet holders 4006, lower optics spring 4042, and upper optics spring 4030 are also shown. The cover 4012 is not shown in FIG. 6. FIG. 6 shows example locations for four suspension wires 4020 and corresponding terminations 4040 at through-holes drilled near the corners magnet holders 4006 of the actuator module 4000, an example location/configuration of upper optics springs 4030 that suspend optics assembly 4060 on suspension wires 4020 and to which magnet holder(s) and optics holder 4004 are attached and thus suspended, and an example location/configuration of lower optics spring 4042 attached to the bottoms or lower surfaces of magnet holder (s) and optics holder 4004. Note that more or fewer suspension wires 4020 may be used in some embodiments.

In the example configuration shown in FIG. 6, four separate magnet holders 4006 are shown disposed around optics holder 4004, each attached to optics springs 4030 and 4042, and each typically holding one of four magnets used in the example actuator module 4000. In some embodiments, the terminations 4040 are located beyond lateral edges 4090 of the base assembly 4008 component along an axis perpendicular to the optical axis of the optics component 4002. In some embodiments, the base assembly component 4008 is a substrate supporting an image sensor for capturing an image data structure representing light received through the optics component 4002. In some embodiments, the optics assembly 4060 includes a magnet holder 4004 having a pocket, step, cavity 4090, or indentation at each wire location that is configured to contain the wire 4020. Some embodiments further include a cover 4012 coupled to the base component 4008.

Manufacturing Methods

Figure 7:
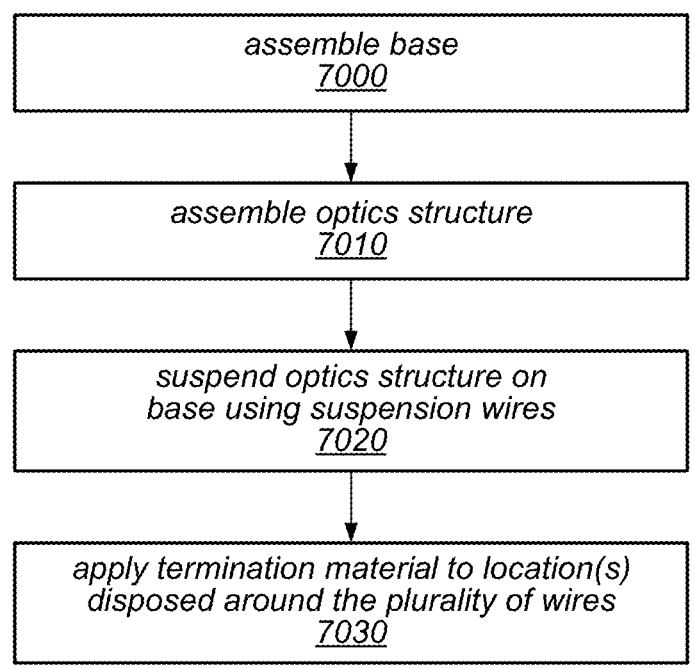
FIG. 7 is a flowchart of a method for manufacturing an actuator module that may be used in a small form factor camera, according to at least some embodiments.
Figure 8:
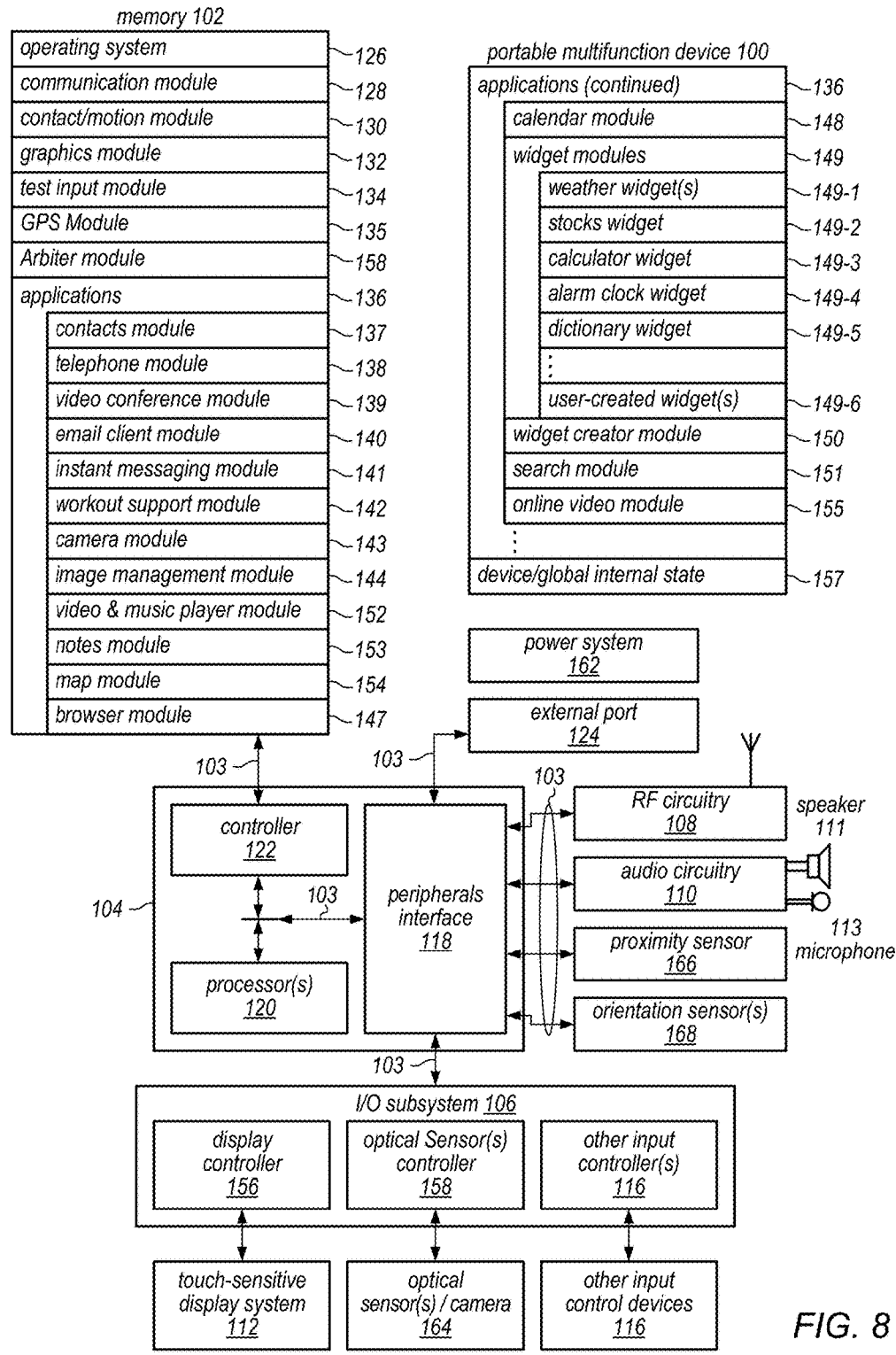
FIG. 8 illustrates a block diagram of a portable multifunction device with a camera in accordance with some embodiments.
Figure 9:
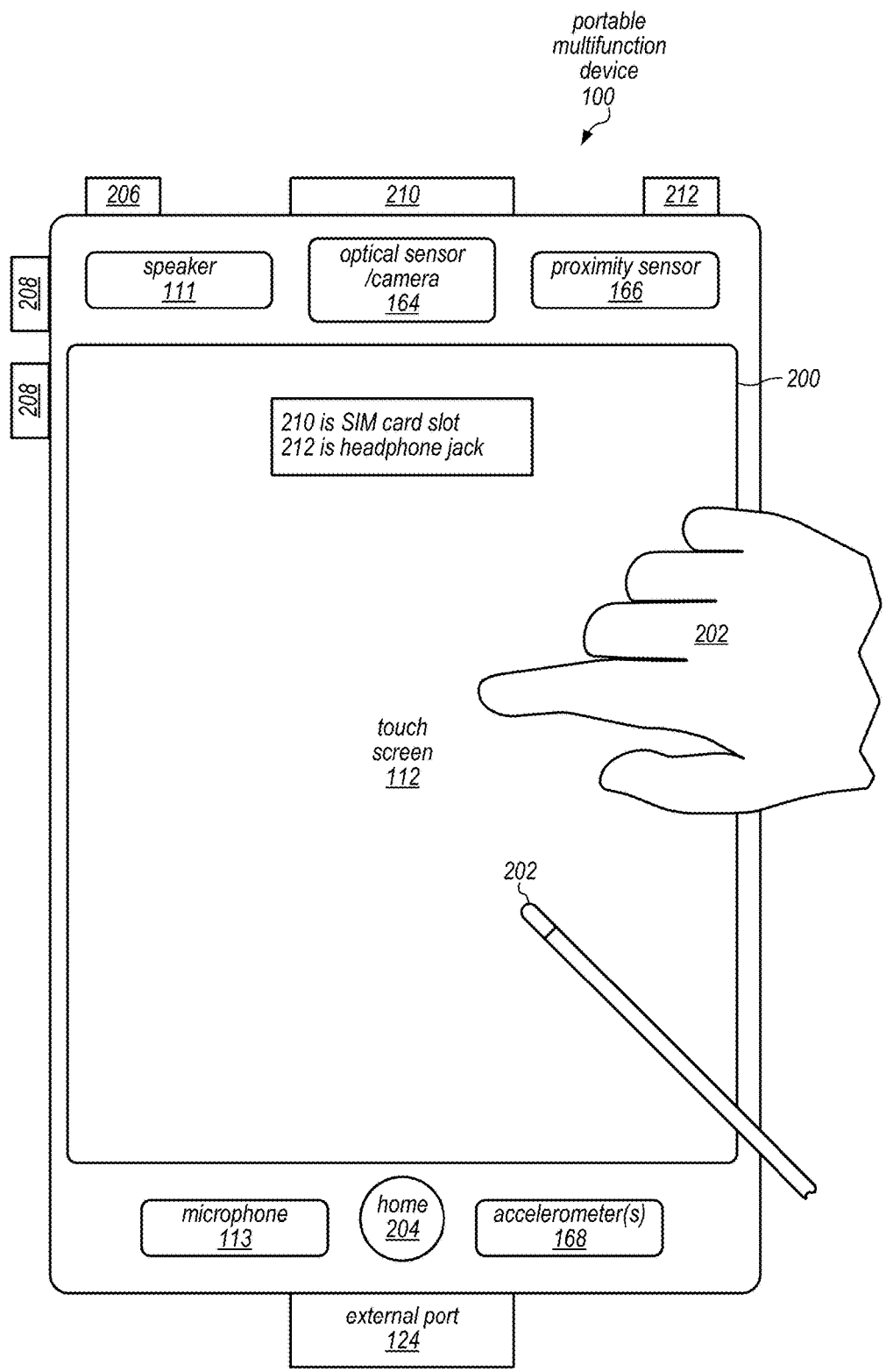
FIG. 9 depicts a portable multifunction device having a camera in accordance with some embodiments.

FIG. 7 is a flowchart of a method for manufacturing an actuator module that may be used in a small form factor camera, according to at least some embodiments. A base is assembled (block 7000). Some embodiments include assembling a base assembly for an optical image stabilization (OIS) voice coil motor (VCM) actuator module. An optics structure is assembled (block 7010). Some embodiments include assembling an optics assembly for the OIS VCM actuator module, such that the optics assembly is configured to move within the actuator module on one or more axes orthogonal to an optical axis of an optics component. The optics structure is suspended on the base using suspension wires (block 7020). Some embodiments include suspending the optics assembly by a plurality of wires connecting to the base assembly of the actuator module, each wire being substantially parallel to the optical axis of the optics component. Termination material is applied to locations disposed around the plurality of wires (block 7030). Some embodiments include terminating the plurality of wires with one or more terminations disposed around the plurality of wires, such that the terminations are located beyond the upper surface plane of the base assembly component, when measured from the optics assembly when measured along an optical axis of the optics assembly.

Multifunction Device Examples

Embodiments of electronic devices in which embodiments of camera modules 3000 as described herein may be used, user interfaces for such devices, and associated processes for using such devices are described. In some embodiments, the device is a portable communications device, such as a mobile telephone, that also contains other functions, such as PDA and/or music player functions. Other portable electronic devices, such as laptops, cell phones, pad devices, or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with cameras. FIG. 11 is a block diagram illustrating portable multifunction device 100 with camera 164 in accordance with some embodiments. Camera 164 is sometimes called an "optical sensor" for convenience, and may also be known as or called an optical sensor system. Embodiments of an actuator module 3000 that includes wire termination for optical image stabilization (OIS) may be used in the optical sensor/camera(s) 164 of a device 100.

Device 100 may include memory 102 (which may include one or more computer readable storage mediums), memory controller 122, one or more processing units (CPU's) 120, peripherals interface 118, RF circuitry 108, audio circuitry 110, speaker 111, touch-sensitive display system 112, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 27 may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternative embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an example embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an example embodiment, projected mutual capacitance sensing technology may be used.

Touch screen 112 may have a video resolution in excess of 100 dots per inch (dpi). In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors or cameras 164. FIG. 27 shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other videoconference participants on the touch screen display.

Device 100 may also include one or more proximity sensors 166. FIG. 27 shows proximity sensor 166 coupled to peripherals interface 118. Alternatively, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 11 shows the one or more orientation sensors 168 coupled to peripherals interface 118. Alternatively, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 157 and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.).

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera module 143 as picture/video metadata, and to applications that provide location-based services such as weather widgets, local yellow page widgets, and map/navigation widgets).

Applications 136 may include the following modules (or sets of instructions), or a subset or superset thereof:

contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which may be made up of a video player
module and a music player module;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

FIG. 28 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the Figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a graphics user interface (GUI) displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the examples herein are given with reference to optical sensor/camera 164 (on the front of a device), a rear-facing camera or optical sensor that is pointed opposite from the display may be used instead of or in addition to an optical sensor/camera 164 on the front of a device. Embodiments of an actuator module 3000 that includes wire termination for optical image stabilization (OIS) may be used in the optical sensor/camera(s) 164

Example Computer System

Figure 10:
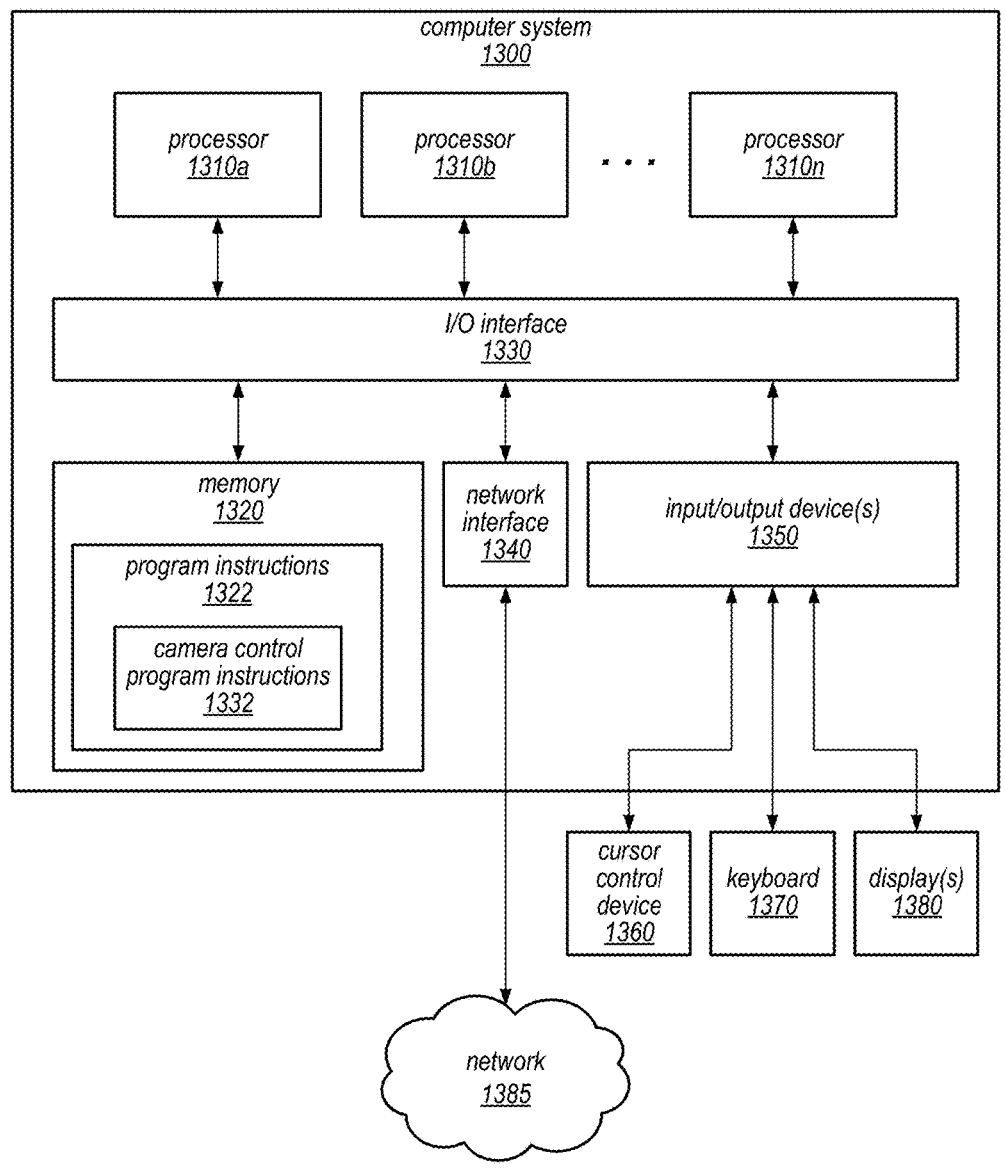
FIG. 10 illustrates an example computer system configured to implement aspects of a system and method for camera control, according to some embodiments.

FIG. 10 illustrates an example computer system 1300 that may be configured to include or execute any or all of the embodiments described above. In different embodiments, computer system 1300 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, may be executed in one or more computer systems 1300, which may interact with various other devices. Note that any component, action, or functionality described above with respect to FIGS. 1 through 26 may be implemented on one or more computers configured as computer system 1300 of FIG. 13, according to various embodiments. In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, and display(s) 1380. In some cases, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments processors 1310 may be general-purpose or embedded processors implementing any of a variety of instruction set architectures (ISAs), such as the x813, PowerPC, SPARC, or MIPS ISAs, or any other suitable ISA. In multiprocessor systems, each of processors 1310 may commonly, but not necessarily, implement the same ISA.

System memory 1320 may be configured to store camera control program instructions 1322 and/or camera control data accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions 1322 may be configured to implement a lens control application 1324 incorporating any of the functionality described above. Additionally, existing camera control data 1332 of memory 1320 may include any of the information or data structures described above. In some embodiments, program instructions and/or data may be received, sent or stored upon different types of computer-accessible media or on similar media separate from system memory 1320 or computer system 1300. While computer system 1300 is described as implementing the functionality of functional blocks of previous Figures, any of the functionality described herein may be implemented via such a computer system.

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network 1385 (e.g., carrier or agent devices) or between nodes of computer system 1300. Network 1385 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or accessing data by one or more computer systems 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

As shown in FIG. 13, memory 1320 may include program instructions 1322, which may be processor-executable to implement any element or action described above. In one embodiment, the program instructions may implement the methods described above. In other embodiments, different elements and data may be included. Note that data may include any data or information described above.

Those skilled in the art will appreciate that computer system 1300 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
an optics assembly comprising an optics component, wherein
the optics assembly is configured to move within the apparatus on one or more axes orthogonal to an optical axis of the optics component,
the optics assembly is suspended by a plurality of wires on a base component of the apparatus, each wire of the plurality of wires being substantially parallel to the optical axis of the optics component;
a base assembly component having an upper surface plane and a lower surface plane, wherein the base assembly component is a substrate supporting an image sensor for capturing an image data structure representing light received through the optics component; and
one or more terminations disposed around the plurality of wires, wherein
the terminations are configured to terminate respective ones of the plurality of wires, and
the terminations are located beyond the upper surface plane of the base assembly component, when measured from the optics assembly.

2. The apparatus as recited in claim 1, wherein the base assembly component includes a pocket, step, cavity, or indentation below the upper surface plane at each location that is configured to receive one of the terminations.

3. The apparatus as recited in claim 1, wherein the terminations are located beyond lateral edges of the base assembly component along an axis perpendicular to the optical axis of the optics component.

4. The apparatus as recited in claim 1, wherein the termination comprises solder applied to a wire of the plurality of wires.

5. The apparatus as recited in claim 1, wherein the termination comprises a resin applied to a wire of the plurality of wires.

6. The apparatus as recited in claim 1, wherein the optics assembly includes a coil holder having a pocket, step, cavity, or indentation at each wire location that is configured to contain the wire.

7. The apparatus as recited in claim 1, further comprising a cover coupled to the base component.

8. The apparatus as recited in claim 1, wherein the base assembly component includes a through-pipe from the upper surface plane to the lower surface plane at each location that is configured to receive one of the terminations.

9. A method, comprising:
assembling an optics assembly for an optical image stabilization (OIS) voice coil motor (VCM) actuator module, wherein
the optics assembly is configured to move within the actuator module;
assembling a base assembly for the OIS VCM actuator module, wherein the base assembly is configured to support an image sensor for capturing light received through the optics assembly and projected onto the image sensor;
suspending the optics assembly by a plurality of wires connecting to the base assembly of the actuator module, each wire being substantially parallel to an optical axis of the optics assembly; and
terminating the plurality of wires with one or more terminations disposed around the plurality of wires, wherein
the terminations are located beyond an upper surface plane of the base assembly.

10. The method as recited in claim 9, wherein the terminating the plurality of wires with one or more terminations disposed around the plurality of wires further comprises applying solder to one or more of the plurality of wires at locations beyond the upper surface plane of the base assembly, when measured from the optics assembly when measured along the optical axis of the optics assembly.

11. The method as recited in claim 9, wherein the terminating the plurality of wires with one or more terminations disposed around the plurality of wires further comprises applying resin to one or more of the plurality of wires at locations beyond the upper surface plane of the base assembly, when measured from the optics assembly when measured along the optical axis of the optics assembly.

12. The method as recited in claim 9, wherein the terminating the plurality of wires with one or more terminations disposed around the plurality of wires further comprises applying mechanical force to one or more of the plurality of wires at locations beyond the upper surface plane of the base assembly, when measured from the optics assembly when measured along the optical axis of the optics assembly.

13. The method as recited in claim 9, wherein the terminations are located beyond the upper surface plane of the base assembly, when measured from the optics assembly along the optical axis of the optics assembly.

14. The method as recited in claim 9, wherein the optics assembly is configured to move within the actuator module on one or more axes orthogonal to the optical axis of the optics assembly.

15. The method as recited in claim 9, wherein:
the terminating the plurality of wires with one or more terminations disposed around the plurality of wires further comprises applying a termination material to locations disposed around the plurality of wires; and the locations disposed around the plurality of wires are located beyond lateral edges of the base component relative to an axis perpendicular to the optical axis of the optics assembly.

16. A camera, comprising:

a photosensor configured to capture light projected onto a surface of the photosensor;

an optics assembly configured to refract light from an object field located in front of the camera onto the photosensor;

an actuator module comprising:

an optical image stabilization (OIS) mechanism configured to move the optics assembly within the actuator module on one or more axes orthogonal to an optical axis of the camera to stabilize an image plane formed by the optics assembly at the photosensor, wherein the optics assembly is suspended by a plurality of wires on a base component of the OIS mechanism, the base component including a substrate configured to support the photosensor, and each wire being substantially parallel to the optical axis, and one or more terminations disposed around the plurality of wires, wherein the terminations are configured to terminate respective ones of the plurality of wires, and the terminations are located beyond an upper surface plane of the substrate, when measured from the optics assembly.

17. The camera as recited in claim 16, wherein the OIS mechanism is a voice coil motor (VCM) technology actuator.

18. The camera as recited in claim 16, wherein each termination comprises a solder termination of the wire.

19. The camera as recited in claim 16, wherein the terminations are located beyond lateral edges of the base component relative to an axis perpendicular to the optical axis of the optics component.

20. The camera as recited in claim 16, wherein each termination comprises a mechanical crimping of the wire.

* * * * *